United States Patent [19]
Ensig et al.

[11] Patent Number: 5,730,253
[45] Date of Patent: Mar. 24, 1998

[54] ROBOTIC SHELF HANDLING APPARATUS

[76] Inventors: Joseph Ensig, 118 Harvest Rd., Levittown, Pa. 19056; Carlos Negron, 9 Brandon Ct., Sicklerville, N.J. 08081

[21] Appl. No.: 661,272

[22] Filed: Jun. 10, 1996

[51] Int. Cl.$^6$ ................................................ B66B 1/00
[52] U.S. Cl. .................. 187/233; 187/237; 187/238; 187/269
[58] Field of Search ............................. 187/233–238, 187/222, 251, 269, 401, 406

[56] References Cited

U.S. PATENT DOCUMENTS

| | | | |
|---|---|---|---|
| 1,457,639 | 6/1923 | Straight | 187/237 X |
| 2,654,487 | 10/1953 | Degener. | |
| 3,447,701 | 6/1969 | Sause, Jr. . | |
| 3,506,138 | 4/1970 | Travis . | |
| 3,799,620 | 3/1974 | Robinson et al. . | |
| 4,258,631 | 3/1981 | Brown . | |
| 4,372,514 | 2/1983 | Glumac . | |
| 4,633,625 | 1/1987 | Dieban et al. . | |
| 5,356,262 | 10/1994 | Babienko et al. . | |
| 5,411,153 | 5/1995 | Unfried . | |
| 5,427,497 | 6/1995 | Dillman . | |
| 5,478,187 | 12/1995 | Gearin et al. . | |

*Primary Examiner*—Boris Milef
*Attorney, Agent, or Firm*—Sperry, Zoda & Kane

[57] ABSTRACT

A robotic shelf handling apparatus usable with a power lifting device such as a swingreach or forklift which can be used to remove and replace large capacity conventional storage shelves. The shelf handling apparatus defines or pockets or slots for receiving a power lifting device fixedly secured thereinto and is positioned between vertically extending corner stanchions of shelving immediately below its shelf to be removed. The apparatus includes a frame with a shelf deck positioning device vertically movable upwardly therefrom to remove a shelf deck. Further the design includes a lateral stabilization means including a plurality of wheels and guide rollers adapted to engage the vertically extending stanchions of the shelving for maintaining lateral stability of the handling apparatus. Also a support bar positioning device is included which is adapted to hold the support bars used for supporting of the deck plates and removing them from engagement with the vertical stanchions as desired. The deck lifting platform of the shelf deck positioning device is interconnected to the main stabilizing wheels for urging them into abutment with the vertically extending stanchions responsive to movement of the deck lifting platform upwardly from the frame.

20 Claims, 4 Drawing Sheets

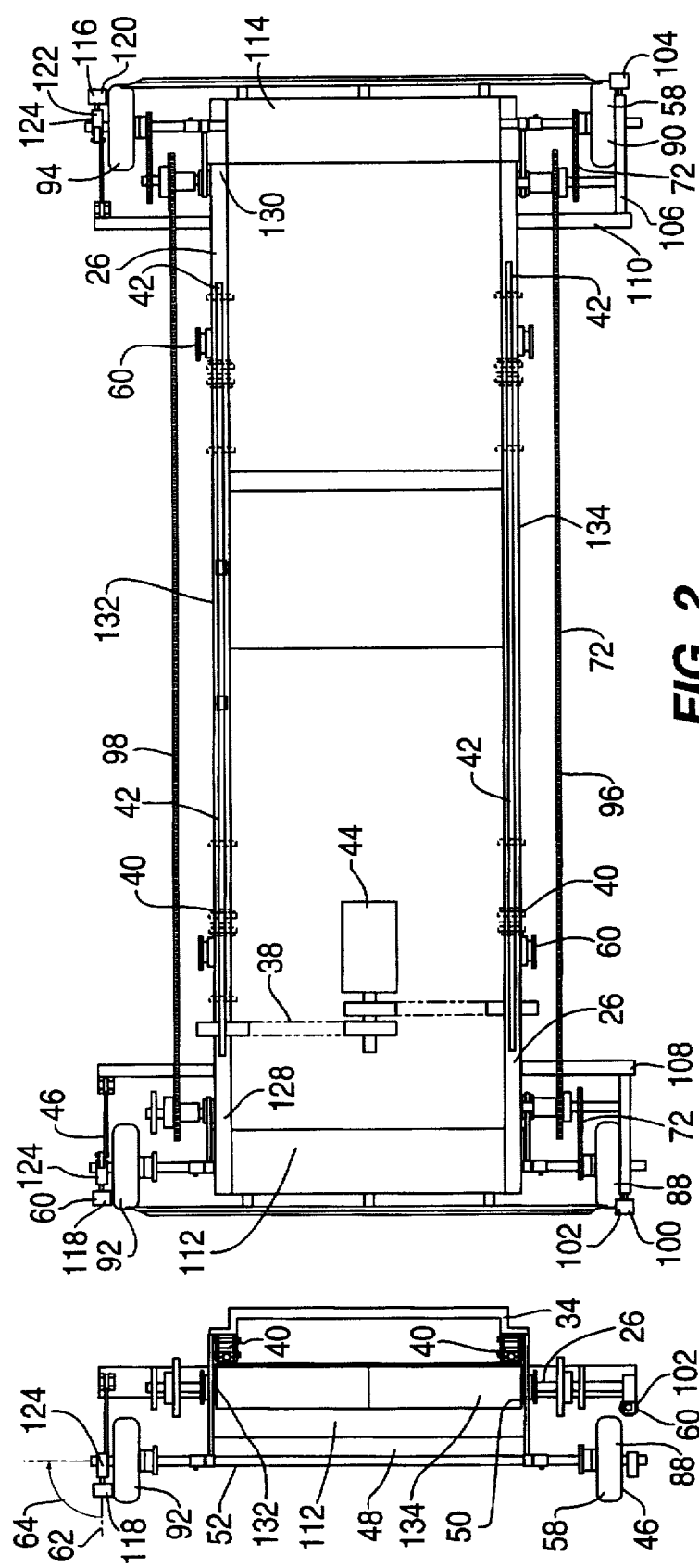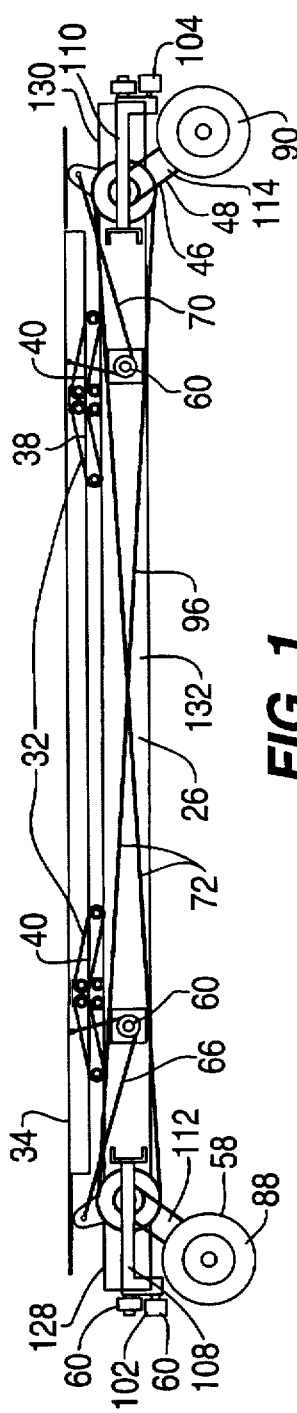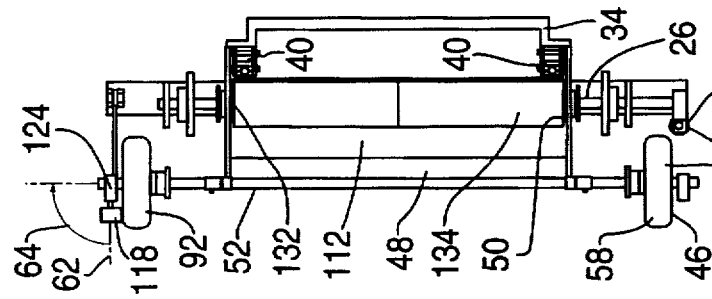

ROBOTIC SHELF HANDLING APPARATUS

BACKGROUND OF THE INVENTION

1. Field of the Invention

The present invention deals with the field of devices useful for facilitating handling of extremely heavy equipment. In particular, the robotic shelf handling apparatus of the present invention is designed to provide an appliance usable with a power lifting device such as a swingreach or forklift to facilitate adjustment of the positioning of large shelving constructions.

Such shelving constructions normally include vertically extending stanchions with shelf support bars detachably secured to these stanchions and extending therebetween with one or more shelf decks resting upon the shelf support bars. The apparatus of the present invention is specifically designed to facilitate re-positioning of the location of the shelf decks and the associated shelf support bars thereof as desired in an easily and convenient manner. Such re-positioning has been formed heretofore by manual labor where one or more humans must lift and remove the shelf deck and the shelf support bar must then be manually replaced into the new engaging position as desired attached to the vertically extending stanchions. The shelf deck is then replaced. Such manual labor is time consuming and dangerous to the personnel performing the operation. As such, it would be preferable to provide a shelf handling apparatus usable with a power lifting device.

2. Description of the Prior Art

Patents have been granted on various configurations of shelving constructions and power lifting appliances and examples of these are shown as U.S. Pat. No. 2,654,487 patented Oct. 6, 1953 to R. Degener and assigned to American Metal Products Company on a "Storage Rack"; and U.S. Pat. No. 3,447,701 patented Jun. 3, 1969 to H. Sause, Jr. on a "Load-Handling Apparatus Including Portable Perch"; and U.S. Pat. No. 3,506,138 patented Apr. 14, 1970 to M. A. Travis and assigned to Ray Steel Company on a "Storage Rack System"; and U.S. Pat. No. 3,799,620 patented Mar. 26, 1974 to C. Robinson et al and assigned to Marcona Corporation on an "Apparatus For Transporting And Handling Bulk Material"; U.S. Pat. No. 4,258,631 patented Mar. 31, 1981 to J. Brown on a "Stackable Collapsible Shipping Rack"; and U.S. Pat. No. 4,372,514 patented Feb. 8, 1983 to N. Glumac on a "Mobile Storage Platform"; and U.S. Pat. No. 4,633,625 patented Jan. 6, 1987 to P. Dieban et al and assigned to Man Gutehoffnungshuette GmbH on a "Pedestal Unit Having Raisable And Lowerable Platforms"; and U.S. Pat. No. 5,356,262 patented Oct. 18, 1994 to F. Babienko et al and assigned to Ferguson Glass B.C. Ltd. on a "High Efficiency Material Handling And Transportation System"; and U.S. Pat. No. 5,411,153 patented May 2, 1995 to G. Unfried on a "Storage Rack Assembly System"; and U.S. Pat. No. 5,427,497 patented Jun. 27, 1995 to B. Dillman on a "Horizontal Surge/Storage Silo"; and U.S. Pat. No. 5,478,187 patented Dec. 26, 1995 to P. Gearin et al and assigned to G & G Intellectual Properties, Inc. on a "Handling Apparatus For Collapsible Lightweight Cargo Carrying Sleeves".

SUMMARY OF THE INVENTION

The present invention provides a robotic shelf handling apparatus which is particularly usable in association with power lifting devices such as a swingreach or a forklift. This handling apparatus is designed to adjust the position of shelving wherein the shelving is positioned between vertically extending stanchions. These stanchions preferably define apertures therein and are capable of interlocking with respect to shelf support bars which may include prongs for extending into the apertures defined in the vertical stanchions. A shelf deck is then positioned on the shelf support bar in order to provide a horizontally extending surface for storage. The present invention provides an automated means for re-positioning the position of the shelf support bars and the shelf deck with respect to the vertically extending stanchions automatically without requiring manual labor for performing this action.

The apparatus of the present invention includes a frame which has a first frame end and a second frame end on opposite locations on the frame. The frame also includes an outer frame side extending from the first frame end to the second frame end and an inner frame side extending from the first frame end to the second frame end also but at a position oppositely located from the outer frame side.

The frame preferably is engageable with respect to a power lifting device such as a swingreach for positioning thereof immediately adjacent to shelving. An interlocking means is provided for allowing this interlocking cooperation between, for example, the arms of a swingreach and the frame itself. Such an interlocking device can include a lateral slot or pocket which is attached with respect to the frame to facilitate movement of the frame and all members secured thereto by power lifting movement of the fork of the power lifting device.

A shelf deck positioning device is included which includes a deck lifting platform which is movably attached with respect to the frame and is selectively capable of upward movement therefrom in abutment with the shelf deck positioned thereabove to urge movement thereof upwardly to a position spatially disposed from the shelf support bar. The deck lifting platform is approximately rectangularly shaped in order to facilitate stabilized support of the shelf deck which is positioned thereon.

A deck jacking device is also fixed secured to the frame and to the deck lifting platform and is adapted to urge relative movement of the deck lifting platform away from the frame. The deck jacking device preferably includes a plurality of scissors jacking devices as well as a jack coupling shaft extending therebetween for ensuring cooperative coordinating operation between the scissors jacking devices. A deck drive is also mounted to the frame and is operatively attached to the deck jacking device in order to cause selective operation thereof. This deck drive is operative to cause actuation of the deck jacking device and relative movement of the deck lifting platform selectively toward and away from the fame. The deck drive is preferably hydraulic and is operatively secured with respect to the jack coupling shafts.

A lateral stabilization means is also included in the present invention for maintaining the horizontal orientation of the frame and the parts movably and fixedly secured thereto with respect to the vertically extending stanchions. This lateral stabilization apparatus includes one or more axle control plates having a pivot end pivotally secured to the frame and an axle end spatially disposed from the pivot end. The axle end includes a main axle extending therealong. The axle control plate is movable between a retracted wheel position for storage and an extended wheel position for laterally stabilizing the frame with respect to the vertically extending stanchions.

The axle control plate configuration generally includes a first axle control plate pivotally secured with respect to the frame means along the first frame end thereof. Also included is a second axle control plate pivotally secured to the frame along the second frame end. A main wheel apparatus is rotatably secured to the axle means and is movable into abutment with the vertically extending stanchions for maintaining lateral stability responsive to pivotal movement of the axle control plate to the extended wheel position. This main wheel apparatus is preferably freely rotatable in such a manner as to allow vertical movement thereof in abutment with respect to the vertically extending stanchions responsive to vertical movement of the frame. More particularly the main wheel apparatus preferably includes four individual wheel members. A first inner main wheel is rotatably secured to the first axle control plate adjacent the inner frame side of the frame. A first outer main wheel is rotatably secured to the first axle control plate adjacent the outer frame side of the frame. A second inner main wheel is rotatably secured to the second axle control plate adjacent the inner frame side and a second outer main wheel is rotatably secured to the second axle control plate adjacent the outer frame side.

Linkage is operative to interconnect some of the main wheels to maintain coordinated rotation thereof. For example, an inner main linkage is positioned operatively to interconnect the first inner main wheel and a second inner main wheel preferably by a chain member extending therethrough. A similar configuration is used for an outer main linkage which operatively maintains coordinated vertical movement of the first outer main wheel with the second outer main wheel.

A guide roller construction is included which is rotatably attached with respect to the frame and defines a roller axis about which the guide roller is rotatable. The roller axis is preferably oriented approximately perpendicular with respect to the main axis of the associated main wheel with the axes of rotation thereof oriented in a plane extending approximately horizontal to facilitate horizontal stabilization of positioning of the frame with respect to the vertically extending stanchions.

Preferably the guide roller apparatus includes a first inner stop roller as well as a second inner stop roller. These rollers are designed to limit the depth of penetration to the apparatus of the present invention into a shelving environment. The guide rollers further include a first outer guide roller rotatably attached with respect to the frame and a second outer guide roller also rotatably attached with respect to the frame which are adapted to be pivotally movable inwardly to allow movement of the apparatus between vertically extending stanchions and to be moved outwardly responsive to vertical movement of the platform to facilitate interlocking with the outermost vertically extending stanchions.

This apparatus includes a flexible coupling device such as a chain means connecting the deck lifting platform operatively with respect to the axle control plate to urge movement of the axle control plate to the extended stabilizing position with the main wheel in abutment with the vertically extending stanchions responsive to movement of the deck lifting platform in a direction away from the frame. Also the flexible coupling apparatus is responsive to urge movement of the axle control plate to the retracted storage position responsive to movement of the deck lifting platform toward, the frame. Preferably the flexible coupling apparatus actually includes an idler pulley rotatably mounted to the frame along with a chain coupling operatively engaging the deck lifting platform and the axle control plate and extending from the idler pulley means therebetween to facilitate operation of the lateral stabilization means.

The present invention preferably also includes a interlocking chain extending between the main wheels which is operatively attached thereto for maintaining coordinated rotational movement between both main guide wheels positioned on the same side of the frame of the apparatus. Also a stop bracket is included preferably including a first stop bracket and a second stop bracket. The first stop bracket is fixedly secured to the frame adjacent the first inner main wheel. The first inner stop roller is preferably rotatably mounted to the first stop bracket and is adapted to be movable into abutment with a vertically extending stanchion for laterally stabilizing of the frame against it. The first inner stop roller is oriented approximately perpendicular with respect to the first inner main wheel. On the other hand the second inner stop bracket and preferably fixedly secured to the frame adjacent the second inner main wheel. This second inner stop roller is preferably rotatably mounted to the second stop bracket and is adapted to be movable into abutment with a vertically extending stanchion. In this manner lateral stabilizing of the frame is achieved. The second inner stop roller is oriented approximately perpendicular with respect to the second inner main wheel.

An outer guide bracket is also included including a first outer guide bracket attached to the first axle control plate in such a manner as to be movable therewith. The first outer guide bracket is positioned adjacent the first outer main wheel and is pivotally movable therewith. This first outer guide roller is rotatably mounted to the first outer guide bracket and is adapted to be movable into abutment with a vertically extending stanchion for laterally stabilizing of the frame any time pivotal movement of the first axle control plate is performed to the extending wheel position. The first outer guide roller is also preferably oriented approximately perpendicular with respect to the first outer main wheel. A second outer guide bracket is also preferably included attached to the second axle control plate in order to be movable therewith. This second outer guide bracket is positioned adjacent the second outer main wheel and is pivotally movable therewith. This second outer guide roller is rotatably mounted to the second outer guide bracket and is adapted to be movable into abutment with a vertically extending stanchion in such a manner as to laterally stabilize the frame against the vertical stanchion in those times when pivotal movement of the second axle control plate is performed to the extended wheel position. The second outer guide roller is also preferably oriented approximately perpendicularly with respect to the second outer main wheel. Further included preferably in the present invention is a support bar positioning apparatus which includes a lateral rod movably attached with respect to the frame and laterally extensible to an extended rod position for facilitating disengagement of the support bar from the vertical stanchion and being laterally retractable to a retracted rod position for facilitating movement therebetween. The positioning apparatus further includes a support drive operatively secured to the lateral rod and operable for urging selective movement thereof between the extended position and the retracted rod position. A support bar holding device is also included secured to the lateral rod remotely from the support drive and movable therewith. This support bar holding means is adapted to selectively retain a shelf support bar within it in order to facilitate engagement with respect to the stanchion whenever movement of the lateral to the retracted rod position is achieved in order to facilitate this engagement thereof with respect to the vertical stanchion. Preferably the support bar holding apparatus includes a U-shaped cup apparatus which is adapted to receive a shelf support bar therein to facilitate control of movement thereof responsive to operation of the support drive for aiding in engaging or disengaging of the support drive with respect to the apertures defined in the vertically extending stanchion.

It is an object of the present invention to provide a robotic shelf handling apparatus usable with a power lifting device for adjusting positioning of industrial shelving wherein total capital cost is minimized.

It is an object of the present invention to provide a robotic shelf handling apparatus usable with a power lifting device for adjusting positioning of industrial shelving wherein re-positioning time is minimized.

It is an object of the present invention to provide a robotic shelf handling apparatus usable with a power lifting device for adjusting positioning of industrial shelving wherein maintenance costs are minimal.

It is an object of the present invention to provide a robotic shelf handling apparatus usable with a power lifting device for adjusting positioning of industrial shelving wherein total down time due to maintenance and malfunction is minimized.

It is an object of the present invention to provide a robotic shelf handling apparatus usable with a power lifting device for adjusting positioning of industrial shelving wherein accurate control is achieved by use of hydraulic controlling mechanisms.

It is an object of the present invention to provide a robotic shelf handling apparatus usable with a power lifting device for adjusting positioning of industrial shelving wherein re-positioning of a shelf at locations is possible without utilizing manual labor.

It is an object of the present invention to provide a robotic shelf handling apparatus usable with a power lifting device for adjusting positioning of industrial shelving wherein shelves can be positioned in very narrow areas which would be impossible to perform manually or otherwise.

It is an object of the present invention to provide a robotic shelf handling apparatus usable with a power lifting device for adjusting positioning of industrial shelving wherein usage with many different types of conventional shelving configurations is possible as long as the shelving includes vertically extending stanchions with shelf support bars detachably engageable therewith and with a shelf deck positionable resting in abutment with the shelf support bar so positioned.

It is an object of the present invention to provide a robotic shelf handling apparatus usable with a power lifting device for adjusting positioning of industrial shelving wherein usage with any type of a power lifting device is possible as long as the lifting device is capable of being secured to the frame by an interlocking arrangement therebetween such as by pockets or slots defined in the frame.

It is an object of the present invention to provide a robotic shelf handling apparatus usable with a power lifting device for adjusting positioning of industrial shelving wherein operation by a single person of both the shelf handling apparatus and the power lifting device is possible.

It is an object of the present invention to provide a robotic shelf handling apparatus usable with a power lifting device for adjusting positioning of industrial shelving wherein lateral stabilization is maintained by multiple guide rollers in rolling engagement with respect to the vertically extending stanchions of the shelving construction.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front plan view of an embodiment of the robotic shelf handling apparatus of the present invention illustrating the shelf deck positioning means;

FIG. 2 is a top plan view of the embodiment shown in FIG. 1;

FIG. 3 is a end plan view of the embodiment shown in FIG. 1;

DETAILED DESCRIPTION OF THE PREFERRED EMBODIMENT

Figures 4, 5:
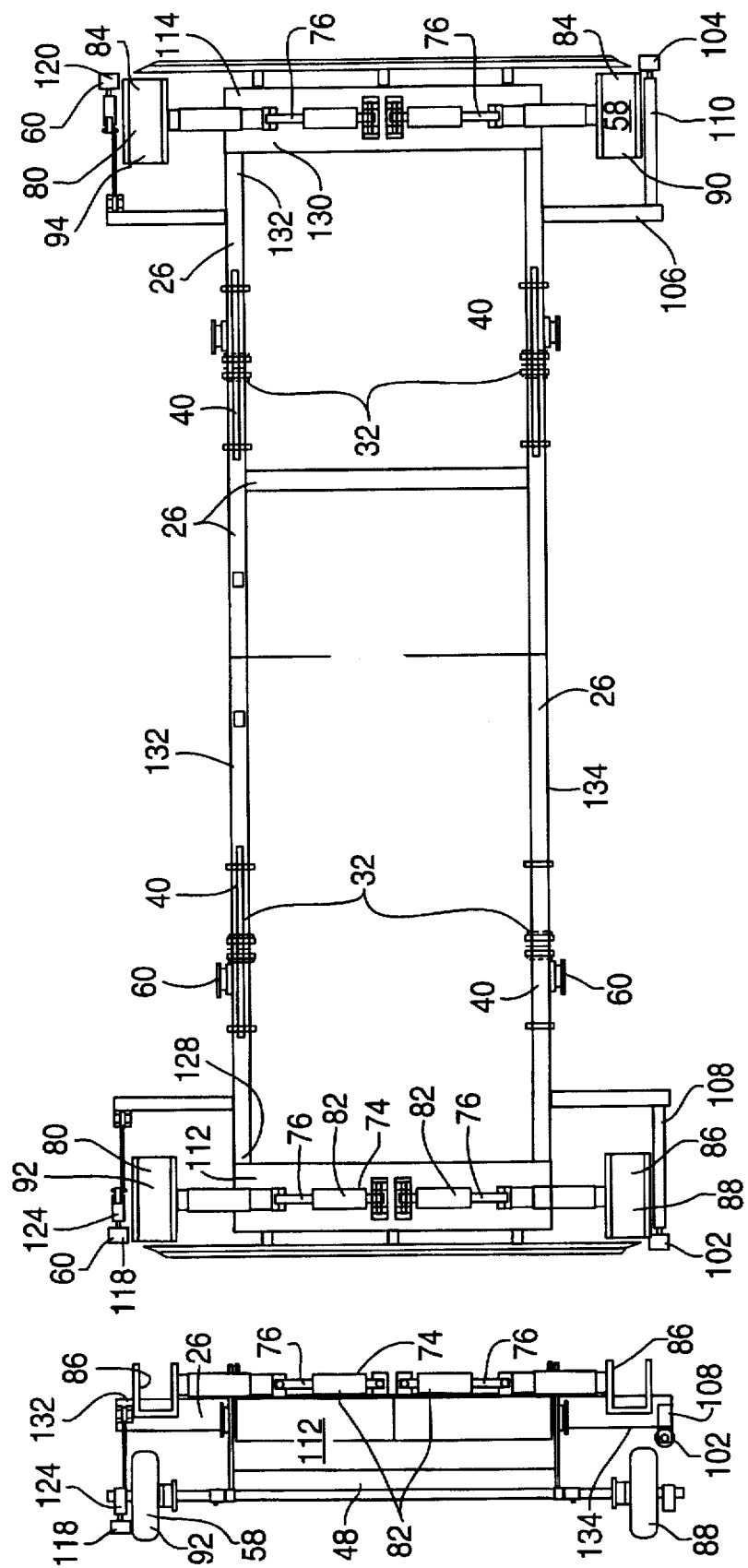
FIG. 4 is a top plan view of an embodiment of the robotic shelf handling apparatus of the present invention illustrating the support bar positioning means
FIG. 5 is a side plan view of the embodiment shown in FIG. 4.
Figure 6:
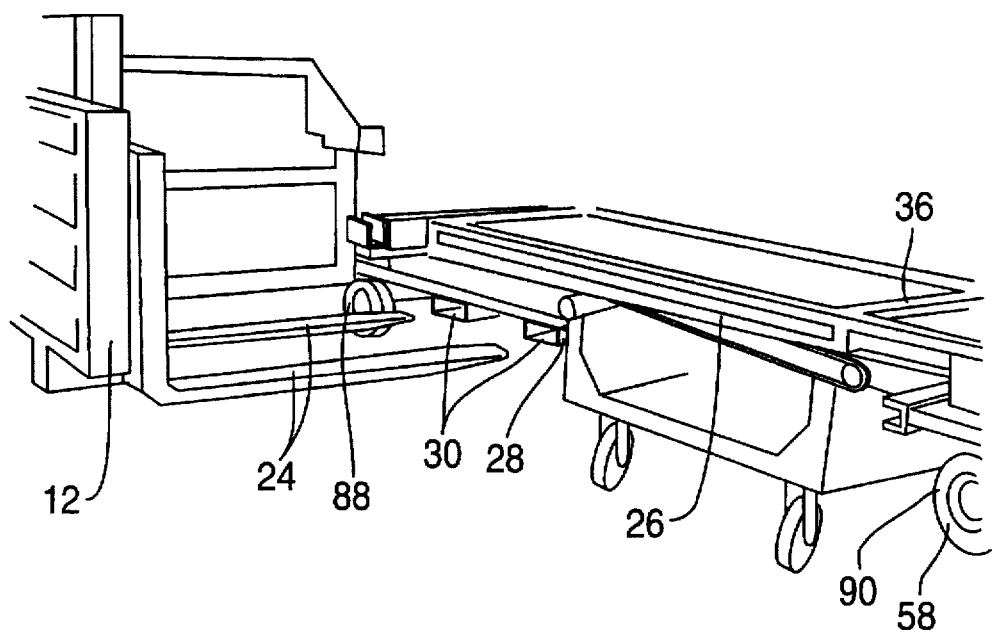
FIG. 6 is an illustration of the robotic shelf handling apparatus of the present invention with a power lifting device such as a swingreach being inserted into the interlocking slots thereof.
Figure 7:
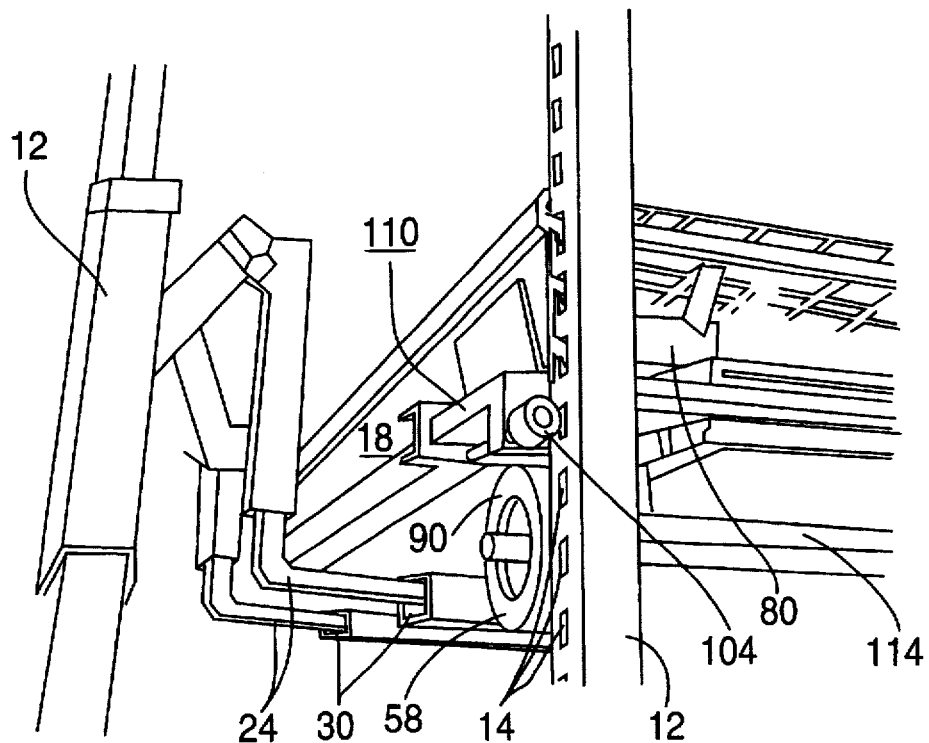
FIG. 7 illustrates the robotic shelf handling apparatus positioned within a conventional industrial shelving array immediately below a shelf deck by a power lifting swingreach.
Figure 8:
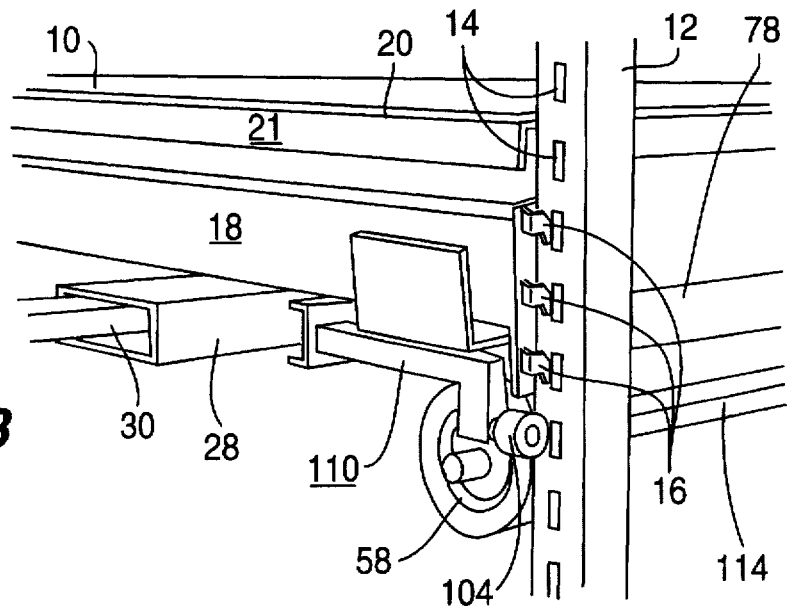
FIG. 8 is a perspective illustration of an embodiment of the robotic shelf handling apparatus of the present invention illustrating the stop bracket and stop roller of the guide roller means and showing a shelf deck and support bar construction freely supported thereon.
Figure 9:
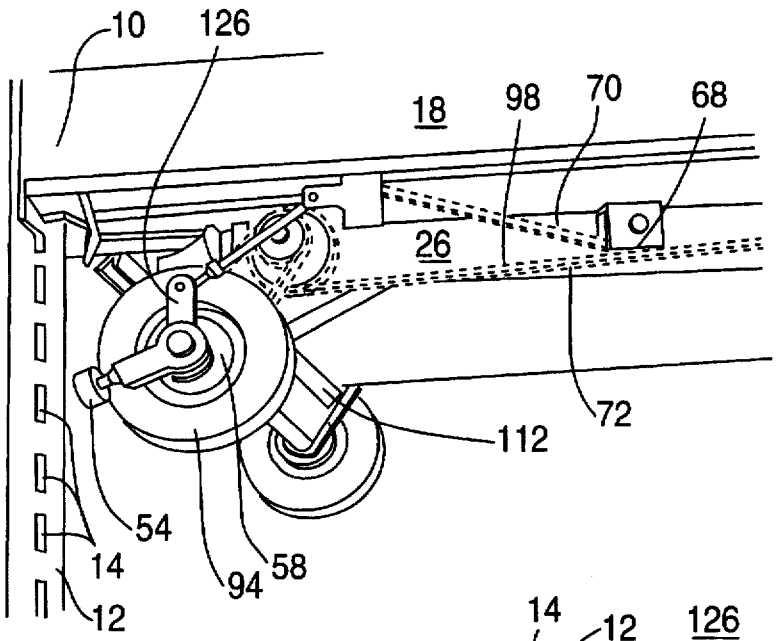
FIG. 9 is an illustration of an embodiment of the robotic shelf handling apparatus of the present invention showing the axle control plate, main wheel and guide roller in the retracted wheel position.
Figure 10:
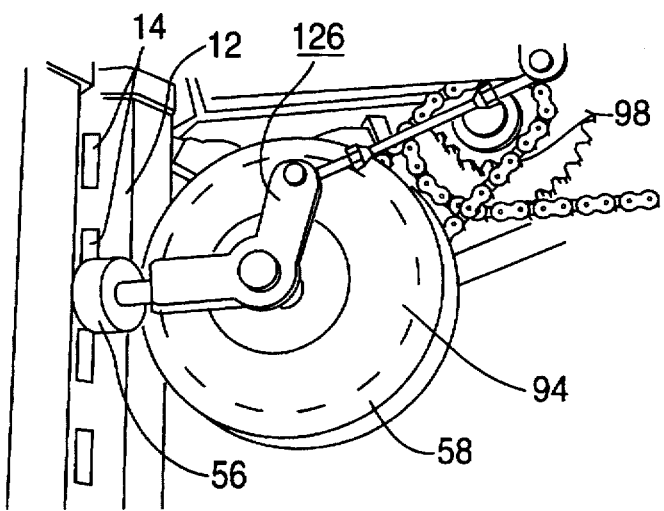
FIG. 10 is an illustration of an embodiment of the robotic shelf handling apparatus of the present invention showing the axle control plate, main wheel and guide roller in the extended position.

The robotic shelf handling apparatus of the present invention is useful with conventionally figured industrial shelving. Such industrial shelving normally includes a plurality of vertically extending stanchions 12 which define a plurality of mounting apertures 14 spaced vertically therealong. Shelf support bars 18 include mounting pins 16 therein which are adapted to be detachably engaged with the mounting apertures 14. With the shelf support bar 18 extending horizontally the mounting pins 16 thereof are preferably adapted to extend into the mounting apertures 14 for detachably yet securely positioning of the shelf support bar 18 in the horizontally extending position between vertically extending stanchions 12. A shelf deck 20 is adapted to be in abutment with the upper portion of the shelf support bar 18 and supported thereby. In this manner the shelf deck 20 which can comprise one or more individual members is adapted to be supported in a horizontally extending orientation by the shelf support bar 18 thereunder to provide a shelf configuration 10 for storage. Such industrial conventional shelf configurations are normally heavy duty and can be rather large and heavy.

The present invention provides a unique robotic shelf handling apparatus which is designed to facilitate re-positioning of the shelf 10 by allowing disengagement of the shelf deck 20 from the shelf support bar 18 and disengagement of the mounting pins 16 of the shelf support bar 18 from the mounting apertures 14 defined in the vertical stanchions 12. In many conventional industrial configurations the shelf deck 20 includes a shelf lip 21 which is adapted to extend around and facilitate gripping of the shelf support bar 18 by the shelf deck 20 to facilitate strength of the overall shelving construction. These shelf lips 21 must be moved vertically out of engaging position with the shelf support bar 18 prior to removal of the mounting pins 16 from the mounting apertures 14 to allow lateral movement of the shelf support bar 18 outwardly from the stanchions 12.

The robotic shelf handling apparatus of the present invention is particularly usable with a power lifting device such as a forklift 22 which may include a fork member 24 which is engageable with respect to the robotic shelf handling apparatus. The frame 26 of the robotic shelf handling apparatus preferably defines an interlocking apparatus 28 which includes a lateral slot or pocket 30 therein. Preferably the pockets or slots 30 are positioned such as to be engageable with respect to the fork member 4 at a power lifting swingreach or forklift 22 in order to facilitate movement of the robotic shelf handling apparatus into the proper position for use thereof.

The robotic shelf handling apparatus of the present invention preferably includes a shelf deck positioning apparatus 32 which includes a deck lifting platform 34 movably secured with respect to the frame 26. Preferably deck lifting platform 34 is movable vertically upwardly from the frame in order to facilitate removal of a shelf deck 20. Preferably the deck lifting platform 34 is of a rectangular shape 36 to facilitate supporting of all parts of an individual shelf deck 20.

Vertical movement of the deck lifting platform 34 with respect to the frame 26 is facilitated by a deck jacking apparatus 38. In the preferred configuration this deck jacking apparatus 38 includes one or more and preferably four scissors jacking devices 40. These devices are designed to operate simultaneously to urge movement of the deck lifting platform 34 upwardly while maintaining the horizontal orientation thereof extending approximately parallel with respect to the frame 26 therebelow.

With use of multiple scissors jacking devices 40 cooperative movement thereof is achieved by a jack coupling shaft apparatus 42 which preferably extends between multiple jacks and at least extends between the multiple jacking apparatus on the same side of the frame in order to maintain cooperative and simultaneous movement thereof. This jack coupling shaft 42 preferably is powered by operation of deck drive means 44. Preferably deck drive means 44 is operable to simultaneously rotate the jack coupling shaft apparatus 42 positioned on both sides of the robotic shelf handling apparatus of the present invention.

This preferred embodiment further also preferably includes a lateral stabilization apparatus 46 including an axle control plate 48. This axle control plate 48 preferably includes a pivot end 50 wherein the axle control plate 48 is pivotally secured with respect to the frame 26 Also the axle control plate 48 includes an axle end 52 which is positioned on the opposite end of the axle control plate from the pivot end 50 thereof. A main guide wheel 58 is preferably pivotally secured with respect to the axle end 52 of the axle control plate 48. The main guide wheels 58 are designed to be movable between a retracted wheel position 54 and extended wheel position 56. This movement is achieved by pivotal movement of the axle control plate 48 with respect to the frame 26. With the axle control plate 48 in the protracted wheel position 54 the main guide wheels 58 will be freely rotatable and retracted On the other hand with the axle control plate 48 rotated to the extended wheel position 56 the main guide wheels 58 will be in abutting engagement with respect to the vertically extending stanchions 12 such as to be vertically movable therealong. By utilization of four wheels in the overall configuration of the main guide wheel apparatus 58 lateral stabilization of the frame and the entire apparatus of the robotic shelf handling device is achievable.

The apparatus of the present invention further includes a plurality of guide rollers 60 which are preferably positioned adjacent to each of the main guide wheels 58 with the axis of rotation perpendicular to the axis of rotation of the main guide wheels 58 in such a manner as to further facilitate the maintaining horizontal integrity of the apparatus of the present design. The axis of the rollers 62 is shown in perpendicular orientation 64 specifically with respect to the axis of rotation of the main guide wheels 58 and the axis therefore defined on the axle end 52 of the axle control plate 48.

A flexible coupling apparatus 66 is also included with the present design which is adapted to urge movement of the axle control plate 48 to the extended wheel position 56 responsive to movement of the deck lifting platform 34 vertically away from the frame 26. This flexible coupling means such as a chain coupling means 70 preferably extends downwardly from the deck lifting platform 34 and around an idler pulley 68 and then extend approximately horizontally to the axle control plate 48. As such, vertical movement of the deck lifting platform 34 will cause the chain coupling means 70 to travel around the idler pulley 68 and thereby move the axle control plate 48 to the extended wheel position 56 with the main guide wheels 58 mounted thereon in abutting engagement with the vertically extending stanchions 12. Movement of the deck lifting platform 34 downwardly will in a similar manner cause movement of the main guide wheels 58 to the retracted wheel position 54.

Cooperative movement between the main guide wheel 58 is an important characteristic of the present invention. For this reason an interlocking chain 72 will preferably extend between each pair of main guide wheels 58 on the same side of the frame 26.

Preferably the present invention further includes a support bar positioning means 74 which includes a lateral rod apparatus 76 movable laterally between an extended rod position 78 and a retracted rod position 80. This support bar positioning apparatus 74 preferably is operated by a support drive 82 for powering thereof. The rods further preferably include a support bar holding apparatus 84 preferably in the form of one or more U-shaped cup members 86 which are adapted to encircle the shelf support bars 18 from the lower direction and thereby support these horizontal bars from below and from the side to facilitate removal thereof from position adjacent the stanchions 12 after removal of the mounting pins 16 thereof from the mounting apertures 14 of the stanchions The frame of the present invention further preferably defines a first frame end 128 and a second frame end 130 horizontally separated from one another as shown in FIG. 1. Similarly the two opposite sides of the frame are defined as an outer frame side 132 positioned preferably within the shelving configuration and an inner frame side means 134 preferably positioned on the aisle side of a shelving configuration. With this construction the first axle control plate 112 will extend along the first frame end means 128. In a similar manner the second axle control plate 114 will extend along and be totally secured with respect to the second frame end 130. As such, a first inner main wheel 88 will be rotatably secured with respect to the first axle control plate 112 on the inner side thereof. In a similar manner the first outer main wheel 92 will be rotatably secured with respect to the outer side of the first axle control plate 112. Pivotal movement of the first axle control plate 112 between the extended and retracted positions will cause similar movement of the first inner main wheel 88 and the first outer main wheel 92.

In a similar manner the second inner main wheel 90 will be secured to the inner end of the second axle control plate 114. Second axle control plate 114 is pivotally secured with respect to the second end of frame 26. The second outer main wheel 94 will be rotatably secured with respect to the outer side of the second axle control plate 114. In this manner total movement of the second axle control plate 114 between the retracted and extended positions will cause similar movement of the second inner main wheel 90 and the second outer main wheel 94.

The first inner main wheel 88 and the second inner main wheel 90 will be operatively linked together for coordinated movement by the inner main linkage chain 96. Also preferably the outer main linkage chain 98 will interconnect the first outer main wheel 92 with the second outer main wheel 94 for ensuring coordinated movement therebetween. The usage of the inner and outer main linkage apparatus 96 and 98 will be useful in maintaining equal movement of the main wheels of the apparatus of the present invention such that as the apparatus is moved vertically in abutting contact with the vertically extending stanchions 12 horizontal orientation will be maintained.

The guide rollers 60 of the present invention are of two different configurations. One configuration is used for those guide rollers positioned adjacent the outer frame side 132 and a different configuration is used for those guide rollers 60 adjacent the inner frame side 134. Those guide rollers 60 adjacent the inner frame side 134 generally comprise stop rollers, that is, a stop bracket 106 is preferably fixedly secured with respect to the frame 26 and preferably includes a first stop bracket 108 positioned adjacent the first inner main wheel 88 and a second stop bracket 110 is fixedly secured to the frame 26 adjacent the second inner main wheel 90. The first inner stop roller 102 is rotatably secured with respect to the first stop bracket 108 and the second inner stop roller 104 is preferably rotatably secured with respect to the second stop bracket 110. The overall configuration of the inner stop roller means 100 is to limit the depth of movement of the robotic shelf handling apparatus of the present invention into the configuration of the shelving construction. As the apparatus of the present invention is moved into the shelving plane between the vertically extending stanchions once the inner stop rollers 100 contact the vertically extending stanchions the depth of penetration is as desired. Preferably the axis of rotation of the first inner stop roller 102 is perpendicular with respect to the first inner main wheel 88. Also similarly preferably the axis of rotation of the second inner stop roller 104 is perpendicular with respect to the axis of rotation of the second inner main wheel 90. With this configuration the stop rollers 102 and 104 provide a two fold purpose. Firstly, they limit the depth of penetration of a robotic shelf handling apparatus the present invention into the plane of the shelving by coming into abutment with the vertically extending stanchions 12 when proper penetration is achieved. Secondly, the inner stop rollers 102 and 104 remaining in abutment with the stanchions 12 at an angle horizontally perpendicular to the angle of abutment of the associated main wheel with respect to the vertical stanchions 12 and, in this manner, roll along the vertically extending stanchions as the robotic shelf handling apparatus of the present invention is moved vertically for re-positioning of a particular shelf.

The outer guide rollers 116 are not fixedly mounted with respect to the frame. These devices in this embodiment are shown mounted with respect to the outer side of each of the axle control plates in order to be retracted simultaneously with retraction of the axle control plates to the retracted position wherein positioning of the apparatus of the present invention is within the shelving plane. Once the apparatus is positioned as desired with the stop rollers 102 and 104 in abutment with the vertically extending stanchions then the outer guide rollers 116 can be pivotally moved with the respective axle control plate as it is pivoted to the extended position for engagement of tile outer guide rollers 116 with respect to the vertically extending stanchions 12 at the same time as the main guide wheels 58 adjacent thereto are positioned in abutment with the stanchions 12.

In the preferred configuration the outer guide roller 116 is mounted on an outer guide bracket 122. Preferably this outer guide bracket 122 is secured to the axle control plate for pivotal movement therewith. Further in the preferred configuration the outer guide bracket 122 includes a first outer guide bracket 124 secured to the outer end of the first axle control plate. A first outer guide roller 118 will be rotatably secured to the first outer guide bracket 124 to be movable into abutment with the vertically extending stanchion 12 thereadjacent simultaneously with movement of the first outer main wheel 92 in abutment with this same stanchion. In a similar manner a second outer guide bracket 126 is preferably mounted on the outer end of the second axle control plate to be pivotally movable therewith. The second outer guide roller 120 is preferably rotatably mounted to the second outer guide bracket 126 in such a manner as to simultaneously contact the vertically extending stanchion 12 whenever the second inner main wheel 90 is also in abutment therewith.

In operation the robotic shelf handling apparatus of the present invention is engaged by a power lifting device 22 such as a swingreach by placement of a fork member 24 thereof into the pockets or slot 30 of the frame 26. The apparatus can be then lifted and moved to a location adjacent the commercial shelving wherein the shelf needs to be removed, placed or re-positioned. For the purposes of the discussion of the operation of the device we will assume that a specific shelf 10 is to be re-positioned.

As such, the operator will cause the fork 24 of the power lifting device 22 to position the robotic shelf handling apparatus of the present invention between the vertically extending stanchions 12 of the shelving immediately below the shelving apparatus to be re-positioned. The operator will then cause the fork member 24 to move vertically until the apparatus abuts and exerts an upwardly extending bias against the lower portion of the shelf 10. In this position the deck lifting platform 34 will be in contact with the under surface of the shelf deck 20 and the U-shaped cups 86 of the support bar positioning apparatus 74 will receive the shelf support bar 18 cradled therewithin.

The user will then initiate operation of the deck drive 44 causing rotation of the jack coupling shafts 42 and operation of the scissors jacking devices 40 of the deck jacking apparatus 38. As such, the deck lifting platform 34 will move upwardly away from the frame 26 therebelow.

Deck lifting platform 34 will exert a bias against the under surface of the shelf decks 20 to cause the shelf lips 21 to disengage with respect to the shelf support bars 18 and to move thereabove.

Simultaneously with this vertical movement of the deck lifting platform 34 the flexible coupling or chain apparatus 66 will cause rotation of the first axle control plate 112 and the second axle control plate 114 to the extended wheel position 56 such that the main guide wheels 88, 90, 92 and 94 will be in rolling abutment with respect to the vertical stanchions 12. Also this pivotal movement of the control plates 112 and 114 will cause the outer guide rollers 118 and 120 to move into abutment with the vertically extending stanchions on the outer side 132 of frame 26. The first and second stop rollers 102 and 104 will already be engaged with the vertically extending stanchions adjacent the inner side of the frame since they will restrict the depth of penetration by the shelf handling apparatus when initially placed beneath the shelf to be re-positioned.

In this manner once the lateral stabilization apparatus 46 including the four main wheels and the four guide wheels are all in locking abutment with respect to the vertical stanchions 12 then horizontal stability will be achieved. At this point the operator can initiate powering of the support drive 82 which will cause the lateral rod 76 to extend outwardly toward the extended rod position 78 which will simultaneously move the shelf support bar 18 away from the vertically extending stanchions 12 and thereby facilitate complete disengagement of the mounting pins 16 from the mounting apertures 14. In this position the shelf support bars 18 and the shelf decks 20 are in a completely freely supported position. The operator can now cause operation of the power lifting device 22 such as by moving of forks 24 thereof up or down along the vertically extending stanchions 12 to move the shelving construction to the new position at which it is desired to be placed. Once the power lifting device 22 has completed this movement the above steps can be reversed for replacement of the shelving apparatus as desired.

In replacing the shelf initially the support drive 82 is activated in the reverse manner causing movement of the lateral rod 76 to the retracted rod position 80. This movement causes engagement of the mounting pin 16 of the shelf support bar 18 into the mounting apertures 14 of the vertical stanchions 12. Thereafter the operator causes reverse operation of the deck drive apparatus 44 which causes downward movement of the deck lifting platform 34 and the shelf deck 20 positioned thereon. As the shelf 20 moves downwardly the shelf lip 21 engages the shelf support bar 18 and finally the shelf deck 20 comes to rest in abutment with the upper surface of shelf support bar 18.

The flexible coupling device 66 simultaneously causes movement of the axle control plates 112 and 114 and the main wheels and guide wheels operatively secured thereto to all move to the retracted wheel position 54. The robotic shelf apparatus can then be removed from the plane of the shelving and the completely automated shelf re-positioning operation has been quickly and efficiently completed.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A robotic shelf handling apparatus usable with a power lifting device and for use with adjustably positionable shelving having vertically extending stanchions detachably interlockable with respect to shelf support bars which are adapted to receive a shelf deck positioned thereupon, said robotic shelf handling apparatus comprising:

A. a frame means including an interlocking means selectively engageable by a power lifting device for positioning thereof immediately adjacent shelving to facilitate movement thereof;

B. a shelf deck positioning means comprising:
  (1) a deck lifting platform movably attached with respect to said frame means and being selectively capable of upward movement therefrom in abutment with a shelf deck positioned thereabove to urge movement thereof upwardly to a position spatially disposed above the shelf support bars;
  (2) a deck jacking means fixedly secured to said frame means and said deck lifting platform and adapted to urge relative movement therebetween;
  (3) a deck drive means mounted to said frame means and operatively attached to said deck jacking means to cause selective operation thereof, said deck drive means being operative to cause actuation of said deck jacking means and relative movement of said deck lifting platform selectively toward and away from said frame means;

C. a lateral stabilizing means comprising:
  (1) an axle control plate means including a pivot end pivotally secured to said frame means and an axle end spatially disposed from said pivot end, said axle end including a main axle extending therealong, said axle control plate means being movable between a retracted wheel position for storage and an extended wheel position for laterally stabilizing said frame means;
  (2) a main wheel means rotatably movably secured to said main axle, said main wheel means being movable into abutment with the vertically extending stanchions for maintaining lateral stability responsive to pivotal movement of said axle control plate means to the extended wheel position;
  (3) a guide roller means for guiding said frame means along said vertically extending stanchions and being, rotatably attached with respect to said frame means and defining a roller axis about which said guide roller means is rotatable, said roller axis being oriented approximately perpendicularly with respect to said main axle;
  (4) a flexible coupling means connecting said deck lifting platform operatively with respect to said axle control plate means to urge movement of said axle control plate means to the extended stabilization position with said main wheel means in abutment with the vertically extending stanchions responsive to movement of said deck lifting platform in a direction away from said frame means and responsive to urge movement of said axle control plate means to the retracted storage position responsive to movement of said deck lifting platform toward said frame means;

D. a support bar positioning means comprising:
  (1) lateral rod means movably attached with respect to said frame means and being laterally extensible to an extended rod position for facilitating disengagement of a support bar from a vertical stanchion and being laterally retractable to a retracted rod position for facilitating engagement therebetween;
  (2) support drive means operatively secured to said lateral rod means and operable for urging selective movement thereof between the extended rod position and the retracted rod position; and (3) a support bar holding means secured to said lateral rod means remotely from said support drive means and being movable therewith, said support bar holding means adapted to selectively retain a shelf support bar therewithin to facilitate engagement thereof with respect to a stanchion responsive to movement of said lateral rod means to the retracted rod position and to facilitate disengagement thereof with respect to a vertically extending stanchion responsive to movement of said lateral rod means to the extended rod position.

2. A robotic shelf handling apparatus as defined in claim 1 wherein said main wheel means is freely rotatable to allow vertical movement thereof in abutment with the vertically extending stanchions responsive to vertical movement of said frame means.

3. A robotic shelf handling apparatus as defined in claim 1 further comprising a stop bracket fixedly secured to said frame means and wherein said guide roller means includes a inner stop roller means rotatably mounted to said stop bracket and adapted to be movable into abutment with a vertically extending stanchion to laterally stabilize said frame means thereagainst.

4. A robotic shelf handling apparatus as defined in claim 1 further comprising an outer guide bracket attached to said axle control plate means and pivotally movable therewith and wherein said guide roller means includes an outer guide roller means rotatably secured to said outer guide bracket, said outer guide roller means being movable along with said main wheel means into a position of abutment with the vertically extending stanchions responsive to movement of said axle control plate means into the extended wheel position.

5. A robotic shelf handling apparatus as defined in claim 1 wherein said main wheel means includes a first inner main wheel and a second inner main wheel and further including an inner main linkage means operatively interconnecting said first inner main wheel and said second inner main wheel for maintaining coordinated movement therebetween.

6. A robotic shelf handling apparatus as defined in claim 5 wherein said main wheel means further includes a first outer main wheel and a second outer main wheel and further including an outer main linkage means operatively interconnecting said first outer main wheel and said second outer main wheel for maintaining coordinated movement therebetween.

7. A robotic shelf handling apparatus as defined in claim 6 wherein said guide roller means includes an inner stop roller arrangement comprising a first inner stop roller and a second inner stop roller and wherein said handling apparatus further includes a stop bracket arrangement which includes:

A. a first stop bracket fixedly secured to said frame means adjacent said first inner main wheel, said first inner stop roller being rotatably mounted to said first stop bracket and adapted to be movable into abutment with a vertically extending stanchion thereadjacent for laterally stabilizing of said frame means thereagainst, said first inner stop roller being oriented approximately perpendicularly with respect to said first inner main wheel; and B. a second stop bracket fixedly secured to said frame means adjacent said second inner main wheel, said second inner stop roller being rotatably mounted to said second stop bracket and adapted to be movable into abutment with a vertically extending stanchion thereadjacent for laterally stabilizing of said frame means thereagainst, said second inner stop roller being oriented approximately perpendicularly with respect to said second inner main wheel.

8. A robotic shelf handling apparatus as defined in claim 7 wherein said axle control plate means comprises a first axle control plate and a second axle control plate spatially disposed therefrom and wherein said guide roller means includes an outer guide roller arrangement comprising a first outer guide roller and a second outer guide roller and wherein said handling apparatus further includes an outer guide bracket arrangement which includes:

A. a first outer guide bracket attached to said first axle control plate to be movable therewith, said first outer guide bracket being positioned adjacent said first outer main wheel and pivotally movable therewith, said first outer guide roller being rotatably mounted to said first outer guide bracket and adapted to be movable into abutment with a vertically extending stanchion thereadjacent for laterally stabilizing of said frame means thereagainst responsive to pivotal movement of said first axle control plate means to the extended wheel position, said first outer guide roller being oriented approximately perpendicularly with respect to said first outer main wheel; and B. a second outer guide bracket attached to said second axle control plate to be movable therewith, said second outer guide bracket being positioned adjacent said second outer main wheel and pivotally movable therewith, said second outer guide roller being rotatably mounted to said second outer guide bracket and adapted to be movable into abutment with a vertically extending stanchion thereadjacent for laterally stabilizing of said frame means thereagainst responsive to pivotal movement of said second axle control plate means to the extended wheel position, said second outer guide roller being oriented approximately perpendicularly with respect to said second outer main wheel.

9. A robotic shelf handling apparatus as defined in claim 8 wherein said first inner main wheel and said first outer main wheel are rotatably mounted on said first axle control plate spatially disposed from one another.

10. A robotic shelf handling apparatus as defined in claim 8 wherein said second inner main wheel and said second outer main wheel are rotatably mounted on said second axle control plate spatially disposed from one another.

11. A robotic shelf handling apparatus as defined in claim 1 wherein said interlocking means includes lateral slot means defined in said frame means adapted to receive a power lifting device extending thereinto.

12. A robotic shelf handling apparatus as defined in claim 1 wherein said deck drive means is hydraulic.

13. A robotic shelf handling apparatus as defined in claim 1 further comprising an interlocking chain means extending between said main wheel means and operatively attached thereto for maintaining coordinated rotational movement therebetween.

14. A robotic shelf handling apparatus as defined in claim 1 wherein said support bar holding means includes U-shaped cup means adapted to receive shelf support bars therein to facilitate control of movement thereof responsive to operation of said support drive means.

15. A robotic shelf handling apparatus as defined in claim 1 wherein said roller axis of said guide roller means and main axle are oriented approximately perpendicular with respect to one another within a plane extending approximately horizontal.

16. A robotic shelf handling apparatus as defined in claim 1 wherein said deck lifting platform is rectangularly-shaped to facilitate stabilized support of a shelf deck positioned thereupon.

17. A robotic shelf handling apparatus as defined in claim 1 wherein said deck jacking means comprises a plurality of scissors jacking devices.

18. A robotic shelf handling apparatus as defined in claim 17 further comprising a jack coupling shaft means operatively secured to said deck drive means and said scissors jacking devices for facilitating movement of said deck lifting platform relative to said frame means.

19. A robotic shelf handling apparatus as defined in claim 1 wherein said flexible coupling means includes:
  A. an idler pulley rotatably mounted to said frame means; and
  B. a chain coupling means operatively attached to said deck lifting platform and said axle control plate means and extending about said idler pulley therebetween to facilitate operation of said lateral stabilizing means.

20. A robotic shelf handling apparatus usable with a power lifting device and for use with adjustably positionable shelving having vertically extending stanchions detachably interlockable with respect to shelf support bars which are adapted to receive a shelf deck positioned thereupon, said robotic shelf handling apparatus comprising:
  A. a frame means including a first frame end and a second frame end spatially disposed therefrom, said frame means further including an outer frame side extending from said first frame end to said second frame end and an inner frame side also extending from said first frame end to said second frame end at a position spatially disposed from said outer frame side, said frame means further including an interlocking means selectively engageable by a power lifting device for positioning thereof immediately adjacent shelving to facilitate movement thereof, said interlocking means including a lateral slot means defined in said frame means to facilitate engagement thereof by a power lifting device;
  B. a shelf deck positioning means comprising:
    (1) a deck lifting platform movably attached with respect to said frame means and being selectively capable of upward movement therefrom in abutment with a shelf deck positioned thereabove to urge movement thereof upwardly to a position spatially disposed above the shelf support bars, said deck lifting platform being approximately rectangularly-shaped to facilitate stabilized support of a shelf deck positioned thereupon;
    (2) a deck jacking means fixedly secured to said frame means and said deck lifting platform and adapted to urge relative movement therebetween, said deck jacking means including a plurality of scissors jacking devices and a jack coupling shaft extending therebetween and operatively attached thereto;
    (3) a deck drive means mounted to said frame means and operatively attached to said deck jacking means to cause selective operation thereof, said deck drive means being operative to cause actuation of said deck jacking means and relative movement of said deck lifting platform selectively toward and away from said frame means, said deck drive means being hydraulic and being operatively secured to said jack coupling shaft;
  C. a lateral stabilizing means comprising:
    (1) an axle control plate means including a pivot end pivotally secured to said frame means and an axle end spatially disposed from said pivot end, said axle end including a main axle extending therealong, said axle control plate means being movable between a retracted wheel position for storage and an extended wheel position for laterally stabilizing said frame means, said axle control plate means including:
      (a) a first axle control plate pivotally secured to said frame means along said first frame end thereof;
      (b) a second axle control plate pivotally secured to said frame means along said second frame end means thereof;
    (2) a main wheel rotatably movably secured to said main axle, said main wheel means being movable into abutment with the vertically extending stanchions for maintaining lateral stability responsive to pivotal movement of said axle control plate means to the extended wheel position, said main wheel means being freely rotatable to allow vertical movement thereof in abutment with the vertically extending stanchions responsive to vertical movement of said frame means, said main wheel means including:
      (a) a first inner main wheel rotatably secured to said first axle control plate adjacent said inner frame side of said frame means;
      (b) a first outer main wheel rotatably secured to said first axle control plate adjacent said outer frame side of said frame means;
      (c) a second inner main wheel rotatably secured to said second axle control plate adjacent said inner frame side of said frame means;
      (d) a second outer main wheel rotatably secured to said second axle control plate adjacent said outer frame side of said frame means;
    (3) an inner main linkage means operatively interconnecting said first inner main wheel and said second inner main wheel for maintaining coordinated movement therebetween;
    (4) an outer main linkage means operatively interconnecting said first outer main wheel and said second outer main wheel for maintaining coordinated movement therebetween;
    (5) a guide roller means for guiding said frame means along said vertically extending stanchions and being rotatably attached with respect to said frame means and defining a roller axis about which said guide roller means is rotatable, said roller axis being oriented approximately perpendicularly with respect to said main axle with the axes of rotation thereof oriented in a horizontally extending plane to facilitate stabilization of positioning of said frame means, said guide roller means including:
      (a) a first inner stop roller rotatably attached with respect to said frame means;
      (b) a second inner stop roller rotatably attached with respect to said frame means;
      (c) a first outer guide roller rotatably attached with respect to said frame means;
      (d) a second outer guide roller rotatably attached with respect to said frame means;
    (6) a flexible coupling means connecting said deck lifting platform operatively with respect to said axle control plate means to urge movement of said axle control plate means to the extended stabilization position with said main wheel means in abutment with the vertically extending stanchions responsive to movement of said deck lifting platform in a direction away from said frame means and responsive to urge movement of said axle control plate means to the retracted storage position responsive to movement of said deck lifting platform toward said frame means, said flexible coupling means including;
  (a) an idler pulley rotatably mounted to said frame means;
  (b) a chain coupling means operatively attached to said deck lifting platform and said axle control plate means and extending about said idler pulley therebetween to facilitate operation of said lateral stabilizing means;
(7) an interlocking chain means extending between said main wheel means and operatively attached thereto for maintaining coordinated rotational movement therebetween;
(8) a stop bracket arrangement comprising:
  (a) a first stop bracket fixedly secured to said frame means adjacent said first inner main wheel, said first inner stop roller being rotatably mounted to said first stop bracket and adapted to be movable into abutment with a vertically extending stanchion thereadjacent for laterally stabilizing of said frame means thereagainst, said first inner stop roller being oriented approximately perpendicularly with respect to said first inner main wheel;
  (b) a second stop bracket fixedly secured to said frame means adjacent said second inner main wheel, said second inner stop roller being rotatably mounted to said second stop bracket and adapted to be movable into abutment with a vertically extending stanchion thereadjacent for laterally stabilizing of said frame means thereagainst, said second inner stop roller being oriented approximately perpendicularly with respect to said second inner main wheel
(9) an outer guide bracket arrangement comprising:
  (a) a first outer guide bracket attached to said first axle control plate to be movable therewith, said first outer guide bracket being positioned adjacent said first outer main wheel and pivotally movable therewith, said first outer guide roller being rotatably mounted to said first outer guide bracket and adapted to be movable into abutment with a vertically extending stanchion thereadjacent for laterally stabilizing of said frame means thereagainst responsive to pivotal movement of said first axle control plate means to the extended wheel position, said first outer guide roller being oriented approximately perpendicularly with respect to said first outer main wheel;
  (b) a second outer guide bracket attached to said second axle control plate to be movable therewith, said second outer guide bracket being positioned adjacent said second outer main wheel and pivotally movable therewith, said second outer guide roller being rotatably mounted to said second outer guide bracket and adapted to be movable into abutment with a vertically extending stanchion thereadjacent for laterally stabilizing of said frame means thereagainst responsive to pivotal movement of said second axle control plate means to the extended wheel position, said second outer guide roller being oriented approximately perpendicularly with respect to said second outer main wheel;
D. a support bar positioning means comprising:
  (1) lateral rod means movably attached with respect to said frame means and being laterally extensible to an extended rod position for facilitating disengagement of a support bar from a vertical stanchion and being laterally retractable to a retracted rod position for facilitating engagement therebetween;
  (2) support drive means operatively secured to said lateral rod means and operable for urging selective movement thereof between the extended rod position and the retracted rod position; and
  (3) a support bar holding means secured to said lateral rod means remotely from said support drive means and being movable therewith, said support bar holding means adapted to selectively retain a shelf support bar therewithin to facilitate engagement thereof with respect to a stanchion responsive to movement of said lateral rod means to the retracted rod position and to facilitate disengagement thereof with respect to a vertically extending stanchion responsive to movement of said lateral rod means to the extended rod position, said support bar holding means including a U-shaped cup means adapted to receive shelf support bars therein to facilitate control of movement thereof responsive to operation of said support drive means.

* * * * *